April 27, 1965   P. P. VIGNERON   3,180,659
ASSEMBLY OF TWO PIPE ELEMENTS
Filed Jan. 5, 1962   2 Sheets-Sheet 1
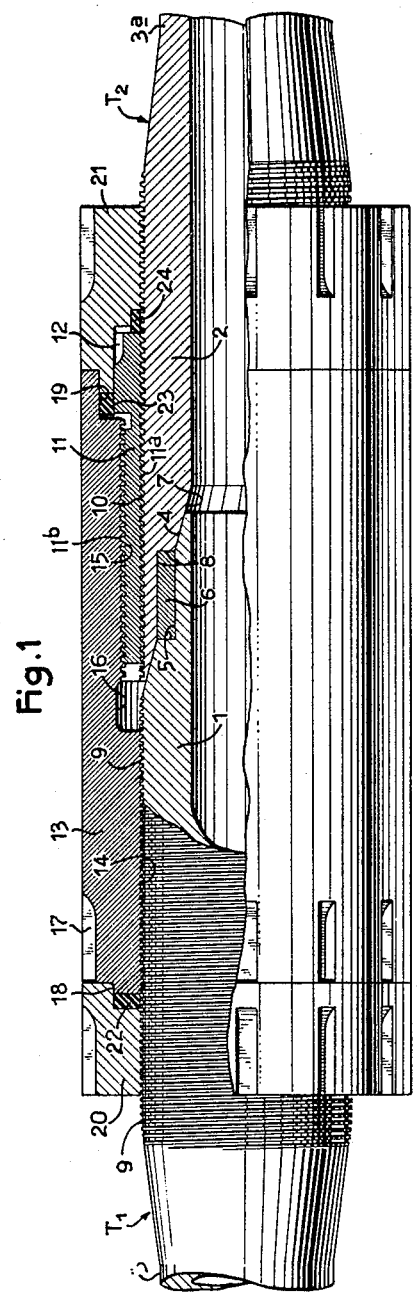
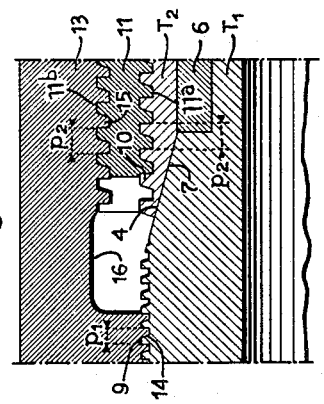
Inventor:
Pierre Paul VIGNERON
by J. Delattre-Seguy
Attorney April 27, 1965 P. P. VIGNERON 3,180,659
ASSEMBLY OF TWO PIPE ELEMENTS
Filed Jan. 5, 1962 2 Sheets-Sheet 2
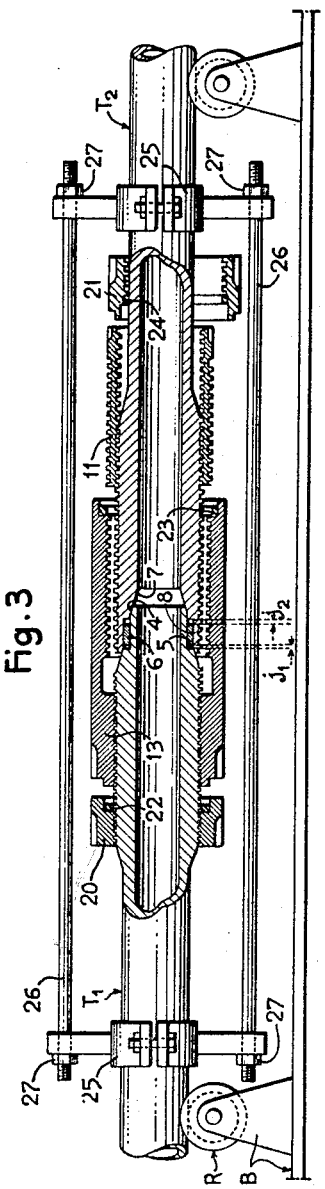
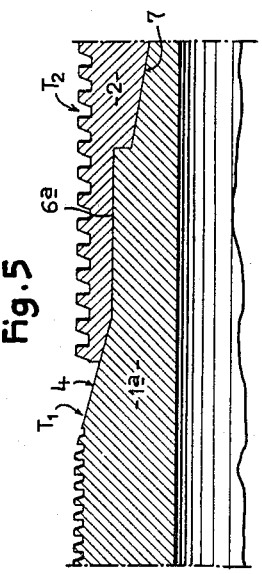
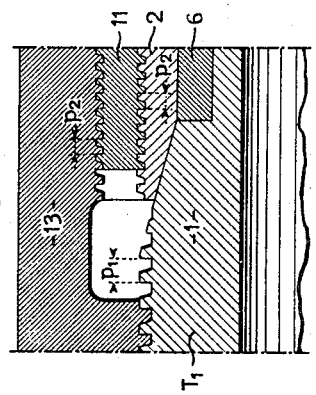
Inventor:
Pierre Paul VIGNERON
by: J. Delattre Seguy
Attorney

United States Patent Office 3,180,659
Patented Apr. 27, 1965

3,180,659
ASSEMBLY OF TWO PIPE ELEMENTS
Pierre Paul Vigneron, Pont-a-Mousson, France, assignor to Compagnie de Pont-a-Mousson, Nancy, France, a French body corporate
Filed Jan. 5, 1962, Ser. No. 164,543
Claims priority, application France, Jan. 18, 1961, 850,023
9 Claims. (Cl. 285—27)

The present invention relates to the connection of pipe elements in particular of piping carrying fluids under a high pressure of, for example, several hundred atmospheres.

The object of the invention is to provide an improved pipe assembly which is very rapidly achieved and provides perfect fluid-tightness at the internal pressure of the fluid in the piping and, if desired, at the pressure outside the piping, for example pressure of water should the piping be immersed at very great depth.

The assembly of the invention is to arranged that the two pipe elements have ends which provide a mutual axial abutment and centering support, have an external screw-thread and are interconnected by the combination of a tube and a sleeve, the tube being screwthreadedly engaged on one of the elements and the sleeve on the other element and the tube and sleeve being interconnected by the screw-threaded engagement of the tube on the sleeve, at least one of the three pairs of screwthreads by means of which the tube and the sleeve are screwthreadedly engaged on the elements and with one another having a screw pitch which is different from that of the other pairs.

By means of this arrangement the tube and the sleeve are screwthreadedly engaged on their respective elements and it is possible, by screwing, to bring into action the pair of screwthreads which has a pitch different from that of the other pairs to obtain a relative axial displacement of the two elements without it being necessary to act directly on the latter.

Anoher object of the invention is to provide piping of which all or a part of the pipe elements are interconnected in pairs by assemblies of the aforementioned improved type.

Further features and advantages of the invention will be apparent from the ensuing description, with reference to the accompanying drawings, to which the invention is in no way limited.

In the drawings:

FIG. 1 is a half longitudinal sectional view and a half elevational view of an assembly according to the invention of two tubular elements of a piping;

FIG. 2 is a partial longitudinal sectional view of a detail of the central portion of said assembly, on a scale larger than that of FIG. 1;

FIG. 3 is an elevational view, with parts cut away, of two pipe elements brought together for the purpose of their assembly, and FIGS. 4 and 5 are views similar to FIG. 2 of two modifications of the invention.

In the embodiment shown in FIGS. 1 and 2, the invention is applied to the assembly of two pipes T1 and T2 preferably of steel. Their ends 1 and 2, which are initially identical, cylindrical and smooth but are subsequently formed by upsetting, have a wall thickness greater than that of the rest, 3 or 3a, of the pipe.

The end 1 of the pipe T1 has a male conical portion 4 for centering purposes and in which is provided a circular recess 5 which has a semi-rectangular cross-sectional shape and is adapted to receive a steel ring 6 of rectangular cross-sectional shape. The end 2 of the pipe T2 has a female conical portion 7, having the same conicity as the portion 4 and in which is also provided a recess 8 which has a semi-rectangular cross-sectional shape, is complementary to the recess 5 and receives the part of the ring 6 which projects from the portion 4.

The end 1 of the pipe T1 has an external screw-thread 9 which has a pitch $p_1$, a trapezoidal tooth profile, for example a rectangular trapezium (FIG. 2) of known type the flanks of which are inclined on the side of the teeth facing the conical portion 4.

The end 2 of the pipe T2 also has an external screw-thread 10 whose tooth profile is similar and in the same direction, the tooth flanks being inclined on the side of the teeth facing the female conical portion 7. However, the screwthread 10 has a pitch $p_2$ different from the pitch $p_1$, for example greater than the latter.

Screwthreadedly engaged on the end 2 of the pipe T2 is a sleeve 11 having an internal screwthread 11a and an external screwthread 11b and having the same pitch p2 as the end 2. This sleeve has at one of its ends a number of grip notches 12 to facilitate rotating the sleeve.

Screwthreadedly engaged on the end of the pipe T1 is a tube 13 having two internal screwthreads 14 and 15 whose pitches $p_1$ and $p_2$ respectively correspond to the external screwthread 9 of the pipe T1 and the external screwthread of the sleeve 11 respectively. The screwthreads 14 and 15 are separated by a cavity 16.

The tube 13 is provided at one of its ends with a number of grip notches 17 to facilitate rotating the tube. It also comprises, at one of its ends, a bearing face 18 and at the other end a socket 19 for the centering of two lock-nuts 20 and 21 respectively. Compressed between the tube and the lock-nuts are sealing rings 22 and 23 composed of flexible and chemically inert material, for example polytetrafluoroethylene.

Compressed between the sleeve and the lock-nut 21 is another sealing ring 24. The rings 22 and 23 are moreover compressed against the screwthreads of the pipes T1 and T2.

The pipes T1 and T2 are assembled in the following manner (FIG. 3):

The lock-nuts 20 and 21 are first screwed on the pipes with their sealing rings 22 and 24 (FIG. 3) and the tube 13 provided with the ring 23 in its socket 19 is screwed on the end 1 of the pipe T1 while the sleeve 11 is partially screwed on the end 2 of the pipe T2. The two pipes are then mounted on a guide device having a stand B (FIG. 3) and carrying rollers R of bi-conical or other shape. Thereafter, the pipes carried by the rollers are shifted together and fitted one inside the other so as to cause the end 4 to fit in the end 7. In the course of this assembly the abutment ring 6, previously mounted on the end portion 4, plays the part of centering means. When the two conical portions are in perfect contact the pipes are maintained in this position by means of a pair of collars 25 clamped round the pipes and maintained in position axially of the pipes by screwthreaded rods 26 and nuts 27. In this position a very small axial clearance $(j_1+j_2)$ of about a few tenths of a millimeter is provided between the abutment ring 6 and the transverse walls of the recesses 5 and 8.

At this point the sleeve 11 is screwed in such manner as to enter the tube 13. If, as usually occurs, the start of the screwthread 15 having a pitch $p_2$ of this sleeve does not coincide with the start of the external screwthread on the sleeve 11, also have a pitch $p_2$, the tube 13 is turned on the pipe T1 having a screwthread of pitch $p_1$ so as to displace the tube 13 in accordance with this pitch until the start of the screwthread stops at a distance from the start of the external screwthread of the sleeve 11 which is equal to the pitch $p_2$ or to a multiple of this pitch. The simultaneous screwing of the sleeve 11 in the tube 13 on the pipe T2 is now possible. In the course of this screwing, the pipe T2 and the tube 13 remain stationary as concerns both axial translation and rotation since the sleeve is screwthreaded internally and externally at the same pitch $p_2$. Therefore this sleeve merely assumes a new axial position between the pipe T2 and the tube 13.

The final stage of assembly consists in screwing the tube 13 on both the end 1 of the pipe T1 and on the sleeve 11. One screwing revolution corresponds to an advance of the tube 13 of a distance equivalent to the pitch $p_1$ relative to the pipe T1 and a distance corresponding to the pitch $p_2$ relative to the stationary sleeve 11 and in consequence relative to the pipe T2. The pipes T1 and T2 do not rotate and, as the pitch $p_2$ is greater than the the pitch $p_1$ for one screwing revolution, the tube constrains the pipe T1 to advance in accordance with the difference $(p_2-p_1)$ and enter still farther the conical portion 7 of the pipe T2. In practice, the tube 13 is screwed only a fraction of a revolution until the axial clearances $j_1$ and $j_2$ of some tenths of a millimeter between the ring 6 and the recesses 5 and 8 have been taken up and the pipes abut against the ring 6 through the medium of the shoulders of these recesses. In the course of the axial moving together the end lips of the pipes become elastically deformed, the lips of the pipe T1 being forced slightly inwardly and those of the pipe T2 slightly outwardly, and this affords a close contact between the portions 4 and 7, forced one inside the other in the manner of wedges, and consequently an energetic tightening of the joint.

Finally, the lock-nuts 20 and 21 are screwed on the pipes T1 and T2 until they are blocked against the tube 13. The pipe joint is then locked and the rods 26 and collars 25 can be removed.

Owing to the conical bearing faces of the joint between the pipes constituted by the inter-engaged portions 4 and 7, these pipes are automatically drawn together to their correct and final position as concerns the centering, alignment and penetration thereof in translation, apart from a final displacement of a few tenths of a millimeter which occurs upon tightening.

Owing to the combination of the conical portions 4 and 7 and the abutment ring 6 which is mounted with a slight axial clearance $(j_1+j_2)$ in the recesses 5 and 8, it is possible to apply the portions 4 and 7 against one another with a tightening action in taking up this axial clearance so as to insure a close contact therebetween and a perfect seal. In this combination the deformation of the end lips of the pipes is restricted and any projection of the lip of the female end outside the male end 4 and of the lip of the male end inside the female end 7 is precluded. In consequence, the internal pressure tends to apply the lip of the male end against the conical portion 7 and the external pressure tends to apply the lip of the female end against the conical portion 4. Thus the joint is capable of resisting very high internal and external pressures of about several hundred atmospheres, should the piping be used for gas immersed in the sea for example.

As there is no substantial axial displacement and rotation of the pipe T1 relative to the pipe T2 in the course of tightening the joint, the conical portions 4 and 7 being in contact and owing to the use of the intermediate sleeve 11 between the pipe T2 and the tube 13, the means employed for this assembly are confined to the guiding device B-R, which is extremely simple and comprises collars 25 and rods 26, and screwing spanners or wrenches. This is the reason why the assembly according to the invention is advantageous in the assembly of pipe elements or sections which cannot be rotated and which are difficult to guide with precision in axial displacement.

Further, the screwing torque required in screwing the tube 13 on the pipe T2 and on the sleeve 11 so as to tighten the joint is relatively low since it is proportional to the pitch differential $(p_2-p_1)$ between the external thread of the sleeve 11 and the screwthread 15 of the tube 13.

The sealing rings 22, 23 and 24 protect the screwthreads from corrosion and mask them off from the external medium which could be harmful.

In a modification shown in FIG. 4, instead of arranging that the pitch $p_2$ be greater than the pitch $p_1$ this pitch is less than the latter. As a result, when the sleeve 11 having a pitch $p_2$ is presented at the start of the tube 13 and the screwthread starts do not coincide, it is merely necessary to continue to screw the sleeve 11 along the pipe T2 so that, after a fraction of a revolution, its external screwthread engages in the internal screwthread 15, having same pitch $p_2$, of the tube 13. If, as usually occurs, the distance between the screwthread starts of the sleeve 11 and the tube 13 is not a multiple of the pitch $p_2$, the sleeve 11 in coming into contact with the tube 13 cannot screw into the screwthread 15 but may rotate the tube 13. The latter then screws along the end 1 having a screw thread of pitch $p_1$ in moving more than the sleeve 11 since $p_1$ is greated than $p_2$. The helical offset between the screwthread starts of the sleeve 11 and the tube 13 is then taken up and this permits the sleeve 11 to screw into the tube 13 which ceases to rotate.

In another modification of the invention shown in FIG. 5, the removable abutment ring 6 of the first embodiment is eliminated and replaced by an annular projection 6a having the same cross-sectional shape on the conical portion 4 of the end 1a of the pipe T1. The end 2 of the pipe T2 is unchanged.

Although specific embodiments of the invention have been described, many modifications and changes may be made therein without departing from the scope of the invention as defined in the appended claims.

Thus, it could be arranged that the sleeve 11 be screwed on the male end of the pipe T1 and the tube 13 on the female end of the pipe T2.

Having now described my invention what I claim as new and desire to secure by Letters Patent is:

1. Pipe assembly comprising a first tubular element and a second tubular element, the ends of said elements being arranged to provide a mutual axial abutment and centering support between one another and each end having an external thread, means for interconnecting the two elements comprising a tube and a sleeve, the tube having a first thread threadedly engaged on said thread of the first element and the sleeve having a first thread threadedly engaged on said thread of the second element, the tube and the sleeve each having a second thread and the tube being threadedly engaged with the sleeve by said second threads, said external threads on the elements having different screw pitches and one of said external threads having the same screw pitch as the screw pitch of said second threads, the pipe assembly further comprising two lock-nuts threadedly engaged on said external threads and in abutting relation to the ends of the tube, interengaging closely contacting cylindrical faces formed on the ends of the tube and on the lock-nuts for centering the lock-nuts on the tube, one of the lock-nuts having a second cylindrical face and the sleeve having a cylindrical face engaging in and closely contacting said second cylindrical face, said cylindrical faces forming part of annular recesses in the tube and lock-nuts and constituting annular cavities formed between the lock-nuts and the tube and between said one of the lock-nuts and the sleeve, sealing rings being disposed in said cavities and supported thereby, two of said sealing rings encompassing and closely engaging said external threads and the other one of said sealing rings being interposed between the tube, the sleeve and said one of the lock-nuts.

2. Pipe assembly comprising a first tubular element and a second tubular element, the ends of said elements being arranged to provide a mutual axial abutment and centering support between one another and each end having an external thread, means for interconnecting the two elements comprising a tube and a sleeve, the tube having a first thread threadedly engaged on said thread of the first element and the sleeve having a first thread threadedly engaged on said thread of the second element, the tube and the sleeve each having a second thread and the tube being threadedly engaged with the sleeve by said second threads, said external threads on the elements having different screw pitches and one of said external threads having the same screw pitch as the screw pitch of said second thread, the two elements respectively comprising adjacent said external thread a male conical face and a female conical face of identical conicity for centering the elements by abutment and interengagement of the conical faces, and the pipe assembly further comprising a hard metal ring having coaxial cylindrical faces, and complementary cylindrical recesses provided in the male conical face and in the female conical face respectively, the cylindrical recesses extending axially of the elements and being in close fitting contact with said cylindrical faces of the ring.

3. Pipe assembly as claimed in claim 2, wherein the recesses in the male and female conical faces terminate in annular faces contained in planes perpendicular to the longitudinal axis of the pipe assembly, and the ring has a substantially rectangular cross-sectional shape in an axial plane of the pipe assembly and abuts said annular faces.

4. Pipe assembly as claimed in claim 2, wherein the ring divides said conical faces into two portions on each side of the ring, the two portions of the two conical faces having their generatrices in the extension of each other.

5. Pipe assembly comprising a first tubular element and a second tubular element, a male conical face formed on the end of the first element and a female conical face formed in the end of the second element, the conicity of the conical faces being identical so as to provide a mutual axial abutment and centering between the elements by interengagement of the conical faces, a first auxiliary abutment means projecting from one of the conical faces and including a face contained in a cylindrical plane and a face contained in a plane perpendicular to the longitudinal axis of the pipe assembly and a second abutment means provided on the other of the conical faces and including a face contained in a cylindrical plane and a face contained in a plane perpendicular to the longitudinal axis of the pipe assembly, the said faces in a cylindrical plane and the faces in said perpendicular plane of the two auxiliary abutment means being respectively closely engaged thereby centering the elements on said longitudinal axis and limiting the penetration of the male conical face in the female conical face, each end having an external thread, means for interconnecting the two elements comprising a tube and a sleeve, the tube having a first thread threadedly engaged on said thread of the first element and the sleeve having a first thread threadedly engaged on said thread of the second element, the tube and the sleeve each having a second thread and the tube being threadedly engaged with the sleeve by said second threads, said external threads on the elements having different screw pitches and one of said external threads having the same screw pitch as the screw pitch of said second thread, two lock-nuts threadedly engaged on said external threads and in abutting relation to the ends of the tube, and interengaging closely fitting cylindrical faces formed on the ends of the tube and on the lock-nuts for centering the lock-nuts on the tube and thereby increasing the rigidity of the pipe assembly.

6. Pipe assembly as claimed in claim 5, wherein the screw pitch of said second threads is larger than the screw pitch of the external thread on the first element.

7. Pipe assembly as claimed in claim 5, wherein the screw pitch of said second threads is smaller than the screw pitch of the external thread on the first element.

8. Pipe assembly as claimed in claim 5, wherein the screw pitch of said external thread on the second element is the same as the screw pitch of said second thread.

9. Pipe assembly comprising a first tubular element and a second tubular element, the ends of said tubular elements being arranged to provide a mutual axial abutment and centering support between one another and each end having an external thread, means for interconnecting the two tubular elements, said means comprising a tube and a sleeve, the tube having a first thread threadedly engaged on said external thread of said first tubular element, and the sleeve having a first thread threadedly engaged on said external thread of said second tubular element, the tube and the sleeve each having a second thread, the tube and the sleeve being threadedly engaged with each other by said second threads, said external threads on said tubular elements having different screw pitches, one of said external threads having the same screw pitch as the screw pitch of said second threads, two lock-nuts threadedy engaged on said external threads and in abutting relation to the ends of the tube, and interengaging, closely fitting, cylindrical faces formed on the ends of the tube and on the lock-nuts for centering the lock-nuts on the tube, thereby increasing the rigidity of said pipe assembly.

References Cited by the Examiner

UNITED STATES PATENTS

| | | | |
|---|---|---|---|
| 196,904 | 11/77 | Ingersoll | 285—175 |
| 593,190 | 11/97 | Bernhardt | 285—332.3 |
| 664,218 | 12/00 | Kaeferle | 285—392 |
| 861,828 | 7/07 | Grindrod | 285—175 |
| 984,470 | 2/11 | Carence | 285—332.3 |
| 1,014,053 | 1/12 | Dolensky | 285—332.3 |
| 1,191,886 | 7/16 | Glauber | 285—175 X |
| 1,570,155 | 1/26 | Karbowski | 285—392 |
| 2,181,343 | 11/39 | Remischissel | 285—390 |
| 2,330,864 | 10/43 | Bruno | 285—332.2 |
| 2,567,113 | 9/51 | Kristensen | 285—175 X |
| 2,757,966 | 8/56 | Samiran | 285—393 X |
| 2,760,673 | 8/56 | Laurent | 285—334.1 |

FOREIGN PATENTS

| | | |
|---|---|---|
| 5,302 | 3/04 | Great Britain. |
| 290,526 | 5/28 | Great Britain. |
| 1,194,024 | 5/29 | France. |

CARL W. TOMLIN, *Primary Examiner*.